(12) United States Patent
Marais

(10) Patent No.: US 6,267,445 B1
(45) Date of Patent: Jul. 31, 2001

(54) LEG REST FOR A SEAT, NOTABLY FOR AN AIRCRAFT

(75) Inventor: Joel Marais, Charost (FR)

(73) Assignee: Societe Industrielle et Commerciale de Materiel Aeronautique, Issoudun (FR)

( * ) Notice: Subject to any disclaimer, the term of this patent is extended or adjusted under 35 U.S.C. 154(b) by 0 days.

(21) Appl. No.: 09/593,444

(22) Filed: Jun. 15, 2000

(30) Foreign Application Priority Data

Jun. 15, 1999 (FR) .................................................. 99 07586

(51) Int. Cl.$^7$ .................................................. A47C 20/00
(52) U.S. Cl. .................. 297/423.36; 297/423.26
(58) Field of Search ........................... 297/423.1, 423.19, 297/423.2, 423.26, 423.28, 423.34, 423.36

(56) References Cited

U.S. PATENT DOCUMENTS 5,352,020   10/1994   Wade et al. .

5,588,708 * 12/1996   Rykken et al. .

FOREIGN PATENT DOCUMENTS 2 744 075    8/1997   (FR) .

* cited by examiner

Primary Examiner—Milton Nelson, Jr.
(74) Attorney, Agent, or Firm—Nixon Peabody LLP; David S. Safran

(57) ABSTRACT

The present device is directed to a leg rest for a seat, such as an aircraft seat, and includes a body having a generally flat support surface, a pivoting mechanism for mounting the body so as to pivot about a front edge of the seat squab so that the surface of the seat squab and the support surface of the body form a dihedron with variable angles. The leg rest further includes an extension mechanism that moves from a retracted position to various unfolded positions in order to adjustably extend the body of the leg rest on its side opposite to the pivoting mechanism, a roller shutter and a guidance mechanism for deploying the roller shutter when the extension mechanism is unfolded so that the roller shutter comes in line with the support surface of the body of the leg rest.

21 Claims, 7 Drawing Sheets

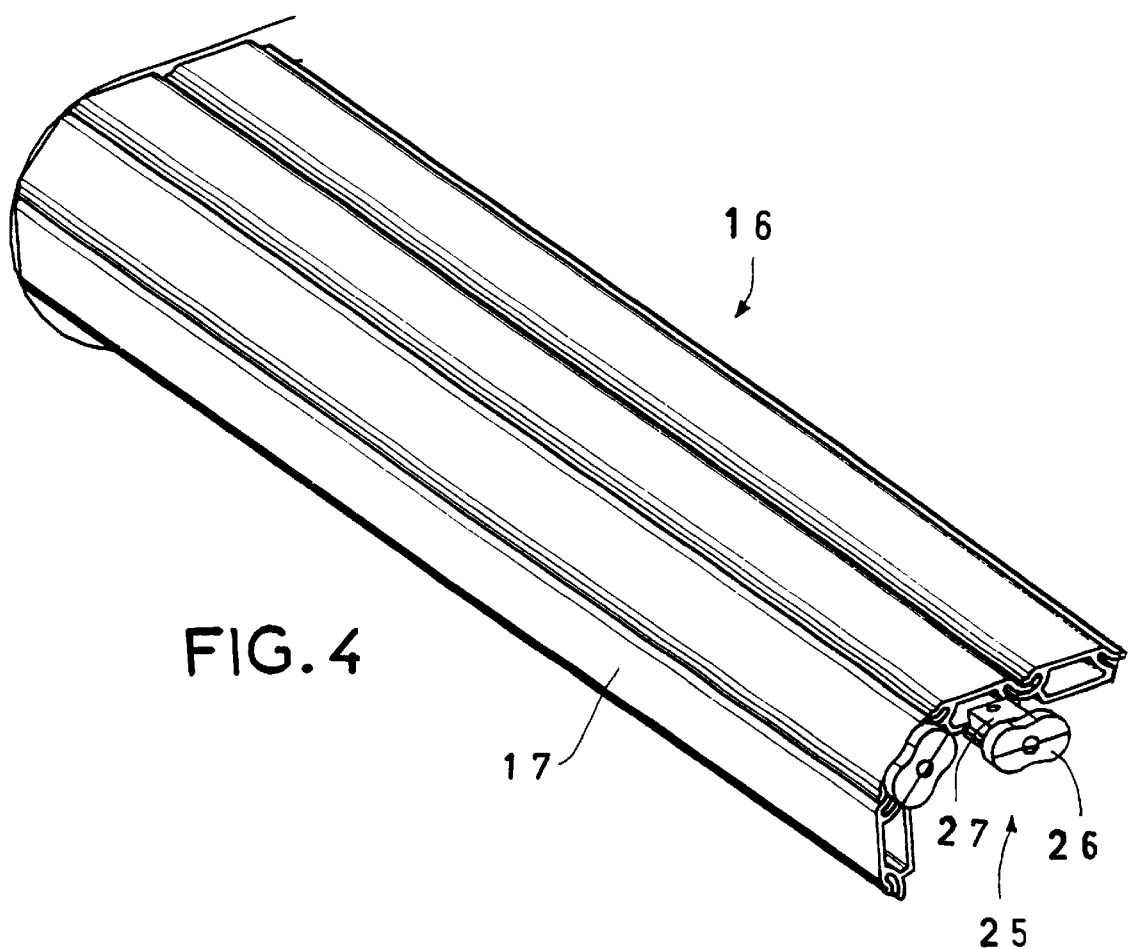
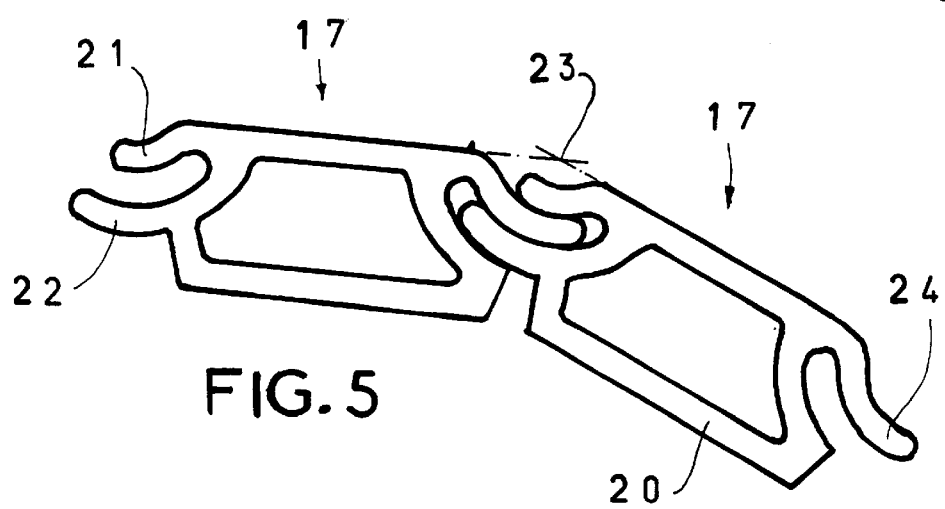

LEG REST FOR A SEAT, NOTABLY FOR AN AIRCRAFT

The present invention relates to a leg rest for a seat, notably for an aircraft.

It is well known that certain seats are provided with a foot rest for the comfort of the user. Seats are also known comprising leg rests, notably seats for aircrafts or rest seats, for improving comfort whilst providing support for the calves of the user.

At the present time, however, there are no seats provided with devices allowing simple and convenient adjustment of such a leg rest.

The present invention aims to remedy this drawback.

To this end, the object of the invention is a leg rest for a seat, notably for an aircraft, characterised by the fact that it comprises:

a body having a generally flat support surface;
pivoting means for mounting the body so as to pivot about the front edge of the seat squab, so that the surface of the seat squab and the support surface of the body form a dihedron with variable angles;
extension means able to move from a retracted position to unfolded positions in order to extend the body adjustably on its side opposite the pivoting means;
a roller shutter; and
guidance means for deploying the roller shutter when the movable extension means are unfolded so that the flap comes in line with the support surface of the body of the leg rest.

Thus the body of the leg rest and the extension means behave like telescopic elements enabling the length of the leg rest to be varied.

During this variation in length, the surface of the roller shutter extends the support surface of the body of the leg rest in order to adapt it to the length of the legs of the user.

It will be observed that it is not necessarily the extension means which, when they are extended, cause the deployment of the roller shutter. It can on the contrary be the roller shutter which controls the movements of the extension means.

It will also be observed that the support surface of the body of the leg rest can consist of a fixed part of the roller shutter.

In a particular embodiment of the invention, the movable extension means form a frame substantially in a U-shape, with the base of the U substantially parallel to the bottom of the seat squab and directed, with respect to the body of the leg rest, in the direction opposite the seat squab.

Also in a particular embodiment, the roller shutter comprises a plurality of slats articulated on each other.

These slats can be produced from a profiled section made of light alloy or by extrusion of plastics material.

Also in a particular embodiment, the guidance means comprise guide tracks arranged to cooperate with guidance members disposed laterally on the roller shutter.

More particularly, the slats can be hollow and the guide members can form end plugs for the slats.

More particularly also, the guidance members can be friction members with a longitudinal section substantially in the shape of knucklebones.

It should be noted that the latter characteristic, facilitating the passage of the roller shutter in curves, can be used in any kind of roller shutter, whatever its application.

Any suitable means can be provided for the articulation of the slats, but provision is preferably made to nest them so that they are articulated on each other by means of cooperating transverse ribs, cylindrical and concentric.

More particularly, the axes of the ribs can be situated in the external support plane of the slats.

The latter arrangements for the articulation of the slats can also be implemented in any roller shutter, independently of its use.

In a particular embodiment, one of the longitudinal ends of the roller shutter is fixed with respect to the body of the leg rest, close to the edge of the leg rest opposite the seat squab, the roller shutter being arranged to be deployed as from this end.

More particularly, the roller shutter can be stored under the body of the leg rest with each of its lateral edges engaged in a guidance track substantially in a U-shape fixed to the movable extension means, the base of the U being directed with respect to the body of the leg rest in the direction opposite the seat squab.

In another particular embodiment, one of the longitudinal ends of the roller shutter is fixed with respect to the movable extension means, the roller shutter being arranged so as to be deployed between this end and the edge of the leg rest opposite the seat squab.

In this last embodiment, the roller shutter can be stored underneath the body of the leg rest with each of its lateral edges engaged in a guidance track substantially in a U shape fixed to the body of the leg rest, the base of the U being directed with respect to the body of the leg rest on the same side as the seat squab.

Also in this last embodiment, the roller shutter can as a variant be stored partially under the body of the leg rest and partly under the seat squab, with each of its lateral edges engaged in a guidance track fixed partly to the body of the leg rest and partly to the seat squab.

In a particular embodiment of the invention, the leg rest comprises connecting means for connecting the body of the leg rest and the extension means.

The connection means can more particularly comprise a rod, one end of which is fixed to the extension means, and means of locking the rod fixed to the body of the leg rest.

Advantageously, the locking means comprise two articulated locking members provided with passage holes for the rod, and elastic means arranged to put the passage holes out of alignment.

In a particular embodiment, the leg rest according to the invention comprises complementary runners fixed respectively to the body of the leg rest and the movable extension means, for a relative movement of the body of the leg rest and the movable extension means.

Also in a particular embodiment, return means are provided for returning the movable extension means to their retracted position.

These return means can notably comprise at least one elastic cable, one end of which is fixed to the body of the leg rest and the other end of which is fixed to the extension means.

More particularly, at least one pulley can be provided, which is fixed to the extension means and through which the elastic cable passes.

Another object of the invention is an aircraft seat comprising a leg rest as described above.

The invention will be clearly understood from a reading of the following description.

FIG. 4 is a perspective view of the roller shutter partially dismantled.

FIG. 5 is a view in section, to a larger scale, of two slats of the roller shutter, nested.

Figure 1:
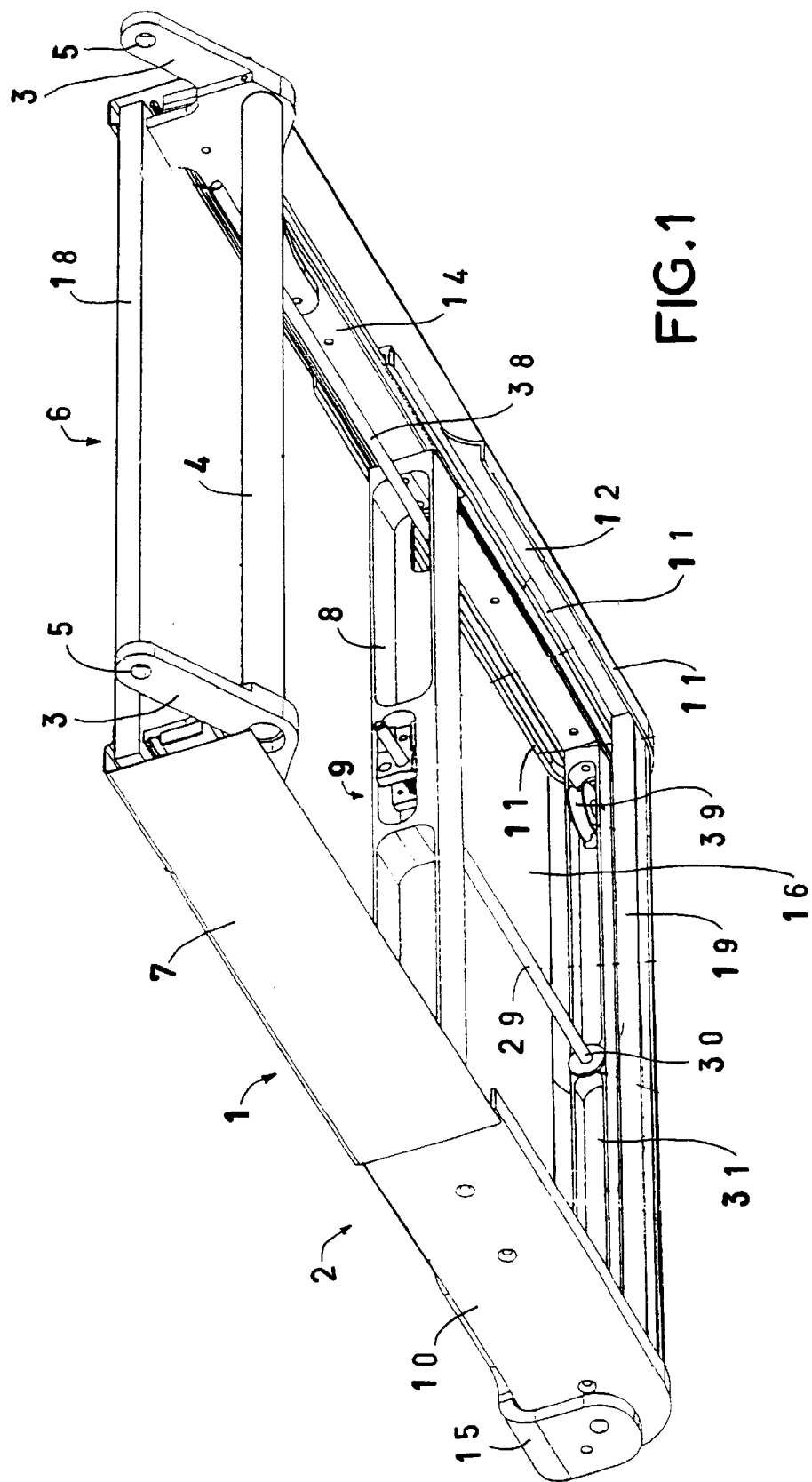
FIG. 1 is a perspective view from below of a leg rest according to the invention, in which the external trim has not been shown.
Figure 12:
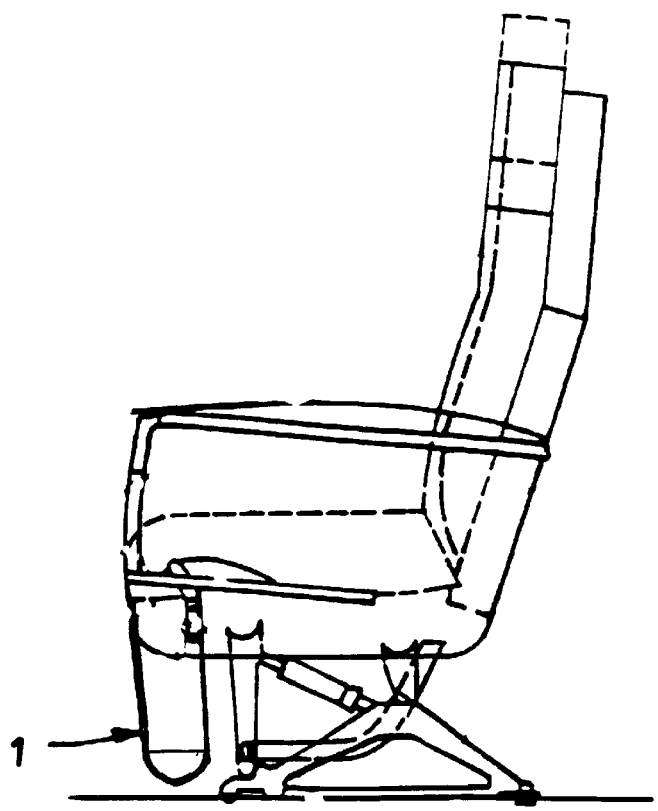
Figure 13:
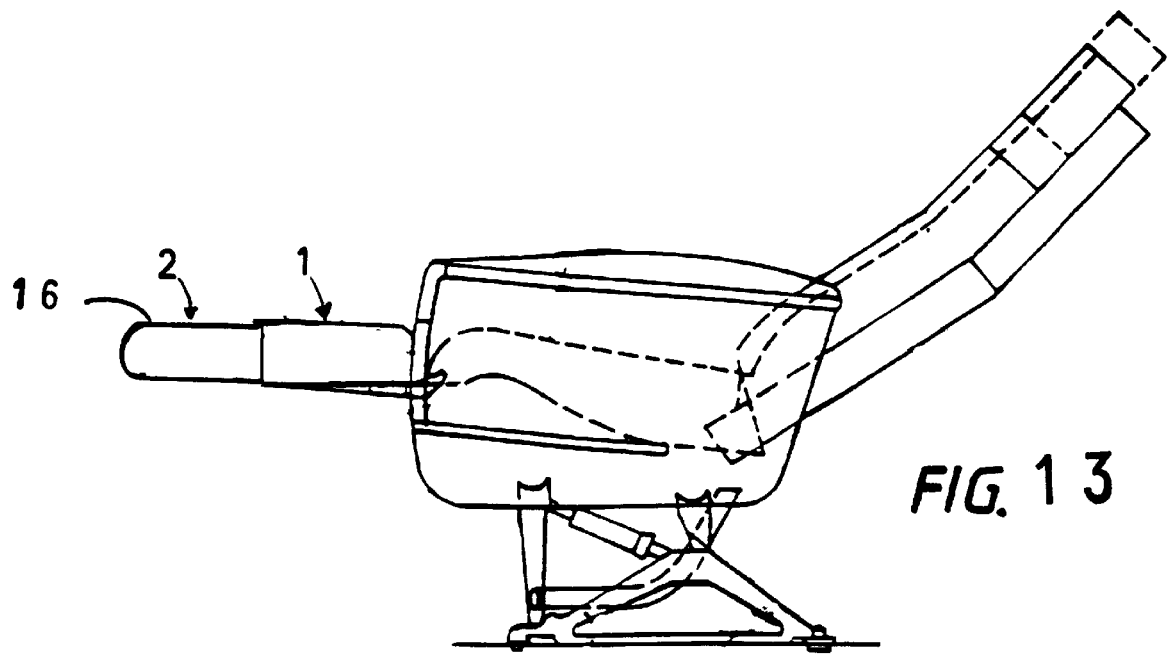

FIGS. 12 and 13 illustrates schematically an aircraft seat comprising a leg rest according to the invention. On FIG. 12 the leg rest is retracted, it is extended on FIG. 13. In FIG. 1 a leg rest can be seen composed essentially of a leg rest body 1 and an extension 2. The extension 2 is mounted on the body 1 sliding in translation telescopically by means which will be described below.

The body 1 is mounted so as to pivot on the structure of the seat (not shown), about an axis substantially merged with the front edge of the seat squab. For this purpose, the body 1 is provided with two fittings 3 connected by a tube 4 and having coaxial mounting holes 5 for the passage of the pivoting shafts.

The pivoting of the body is obtained by any suitable means such as a mechanical or electromechanical jack whose body is mounted on the structure of the seat and whose rod is connected to a part of the body 1 of the foot rest.

The body 1 is also composed of a generally flat support surface 6, with lateral cheeks made of sheet metal 7, and a cross-member 8 supporting a locking mechanism 9, which will be described below.

The extension 2 comprises essentially two lateral roller shutter supports 10. Each support is generally flat and disposed in a vertical plane. Each support has two parallel ribs 11 projecting inwards in order to delimit a guidance track 12 oriented towards the mid-plane of the leg rest.

Each rib 11, and therefore each guidance track 12, has a U shape whose legs are substantially horizontal and whose concavity is turned towards the seat, that is to say the base of the U is directed in the direction opposite the body of the leg rest.

Each lateral support 10 also receives on its internal face a runner element 13 able to cooperate with a runner element 14 fixed to the leg rest body 1 to allow the relative sliding of the extension 2 with respect to the leg rest body. The runner elements 13 and 14 are for example of the type used in the furniture industry for forming ball bearing travellers for mounting furniture drawers. Suitable stops are provided for limiting the movement of the extension 2.

Finally, a foot rest 15 is mounted at the end of these supports 10, pivoting between a folded position depicted in FIG. 1 and a position of use.

A roller shutter 16 provides the continuity of the support surface 6 when the extension 2 unfolds telescopically. Here, in fact, it is a fixed end part of the roller shutter 16 which forms the support surface 6.

The roller shutter 16 is formed by identical nested and articulated slats 17, with the exception of the fixed end slat 18 secured to the leg rest body 1 and to the other end slat 19.

Each running slat 17 is formed by a hollow profiled section 20 from which three cylindrical articulation ribs project.

Two of these ribs 21 and 22 issue from one of the sides of the profiled section 20 and are concentric, with an axis 23 situated in the plane of the top surface of the profiled section 20. The other rib 24 also has as its axis a point situated in the plane of the top surface of the profiled section and has its mid-line at a distance from the axis 23 intermediate from those of the ribs 21 and 22.

When the slats are nested in each other, as depicted in FIG. 5, the rib 24 of a slat is engaged between the ribs 21 and 22 of the adjacent slat, and the axis of curvature of the three slats is common, situated whatever the angle between the slats at the intersection between the planes of the top surfaces of the adjacent slats.

It is thus possible to obtain an angular movement in both directions between the adjacent slats. As a result the guidance tracks 12 do not necessarily need to be rectilinear.

It should be observed that the arrangement which has just been described makes it possible to keep a constant distance between the top surfaces of the slats 17, whatever the angle between the slats, which is of particular interest with regard to any textile trim on the roller shutter.

Each slat is closed at its end by plugs 25, for example made of moulded plastics material, preventing in particular the entry of dust inside the profiled section 20.

The plugs 25 consist of a head 26 able to engage and slide in the guidance tracks 12, and a tail 27. The tail 27 has a shape enabling it to engage in the profiled section 20, and the head 26, produced from non-friction material, has two support layers 28 having in cross-section the shape of a knucklebone. This shape provides an even rotation of the roller shutter in the parts of the guidance tracks 12 on a curve.

The device according to the invention also comprises a locking rod 29, one end 30 of which is fixed to a cross-member 31 on the extension 2, and which passes through the locking mechanism 9.

The mechanism 9 consists of two locking members 32 articulated on a base block 33 about shafts 34. The two members 32 are kept separated by a helical spring 35 and each have, in the axis of this spring, a hole 36 able to receive the rod 39. Thus, in the normal position, the rod 29 is locked by buttressing because of the lack of alignment of the holes 36 in the members 32.

A cable, not shown, is engaged in holes 37 in the locking members 32 in order to control the bringing together of the members counter to the action of the spring 35, under the control of a knob available to the occupant of the seat. It is thus possible to release the movement of the extension 2 and to adjust its position continuously by direct action of the feet of the occupant on the foot rest 15.

Finally, two elastic cables 38 (of the "Sandow" type) each have one of their ends fixed to the body 1 of the leg rest, and their other end fixed to the extension 2. Each of these cables passes over a pulley 39, the rotation shaft of which is mounted on the extension 2. These two elastic cables 38 provide the retraction of the extension 2 into the body 1 of the leg rest when the locking means 9 are released and the action of the user on the foot rest 15 ceases.

Figure 2A:
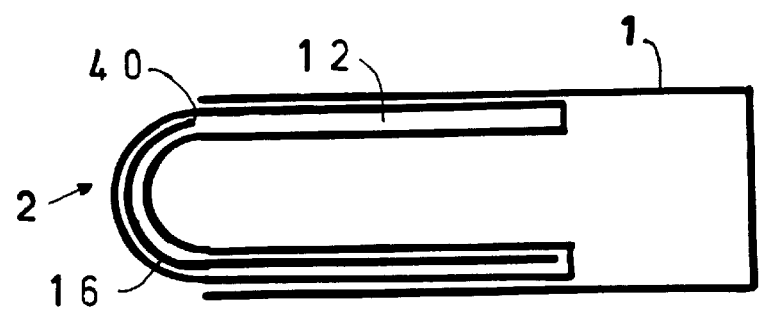
FIGS. 2a, 2b and 2c illustrate schematically the functioning of a leg rest according to a first embodiment of the invention.
Figure 2B:
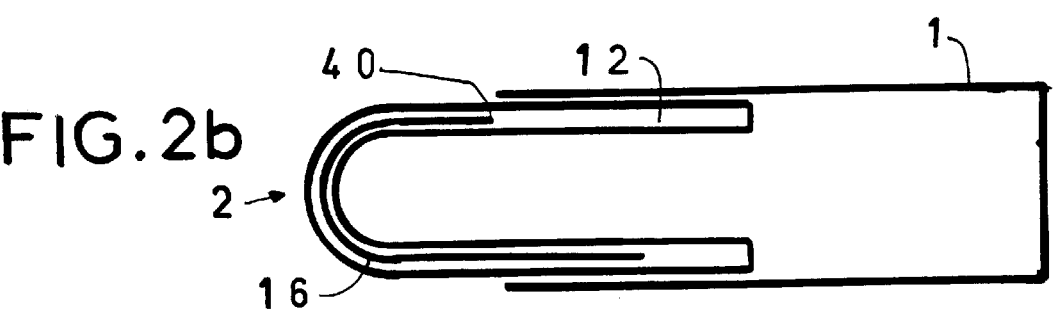
Figure 2C:
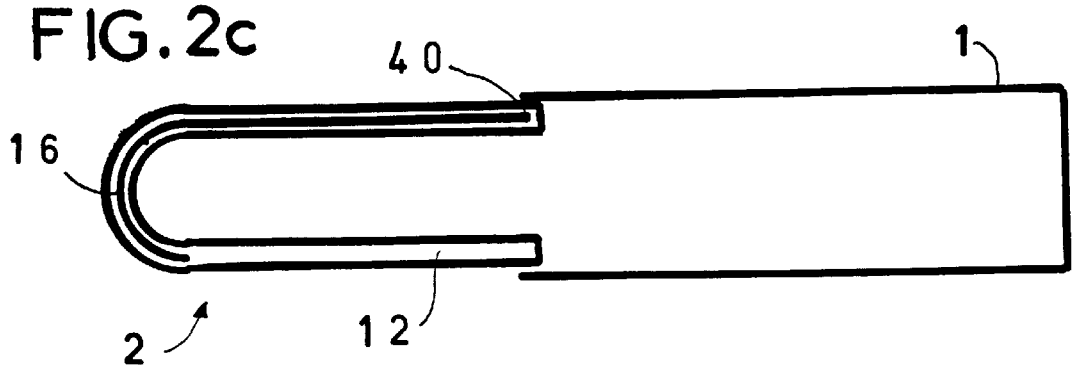

FIGS. 2a to 2c illustrate the functioning of the device which has just been described. FIG. 2a depicts this device with the extension 2 retracted, and FIG. 2c with the extension 2 completely unfolded.

In these three figures the end 40 of the roller shutter 16 can be seen, fixed with respect to the body 1 of the leg rest. As the extension 2 is gradually extracted from the body 1 of the leg rest, the lateral edges of the roller shutter 16, in fact the heads 26 of the plugs 25, slide in the guidance tracks 12, causing a progressive unwinding of the top surface of the roller shutter 16 whilst its bottom surface decreases correspondingly.

Figure 3A:
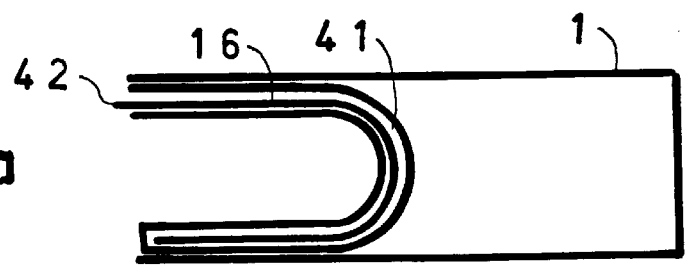
FIGS. 3a and 3b illustrate schematically the functioning of a leg rest according to a second embodiment of the invention.
Figure 3B:
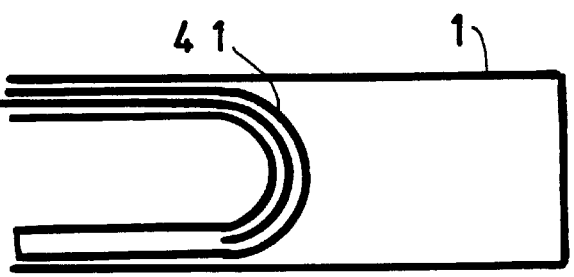
Figure 6:
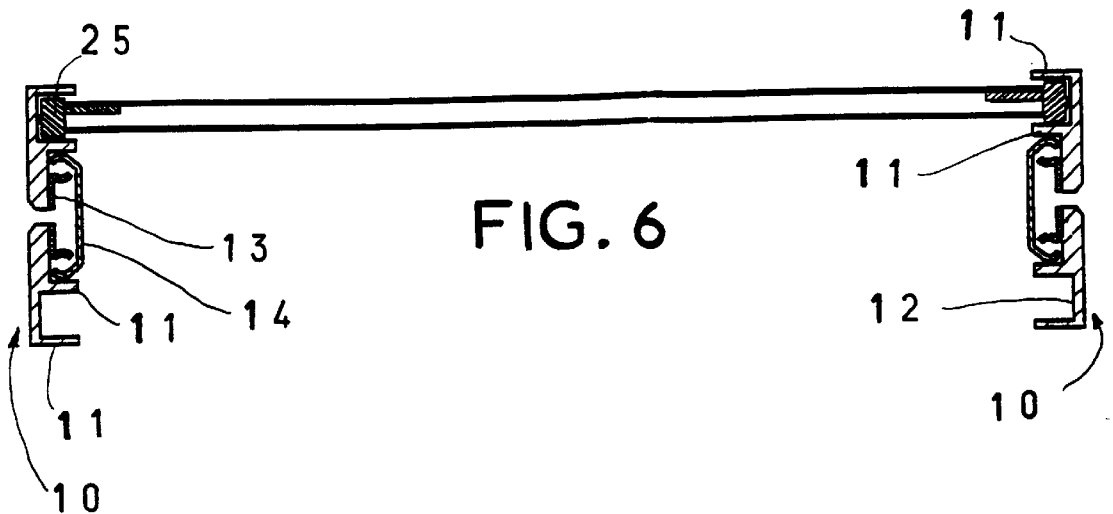
FIG. 6 is a view in transverse section of the roller shutter and its guidance mechanism.
Figure 7:
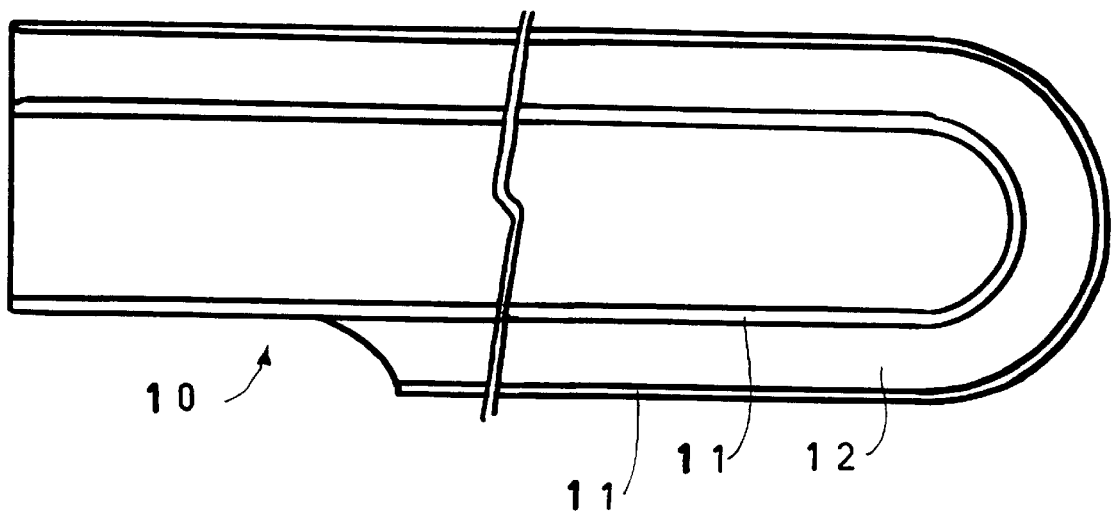
FIG. 7 is a side view of the guidance mechanism.
Figure 8:
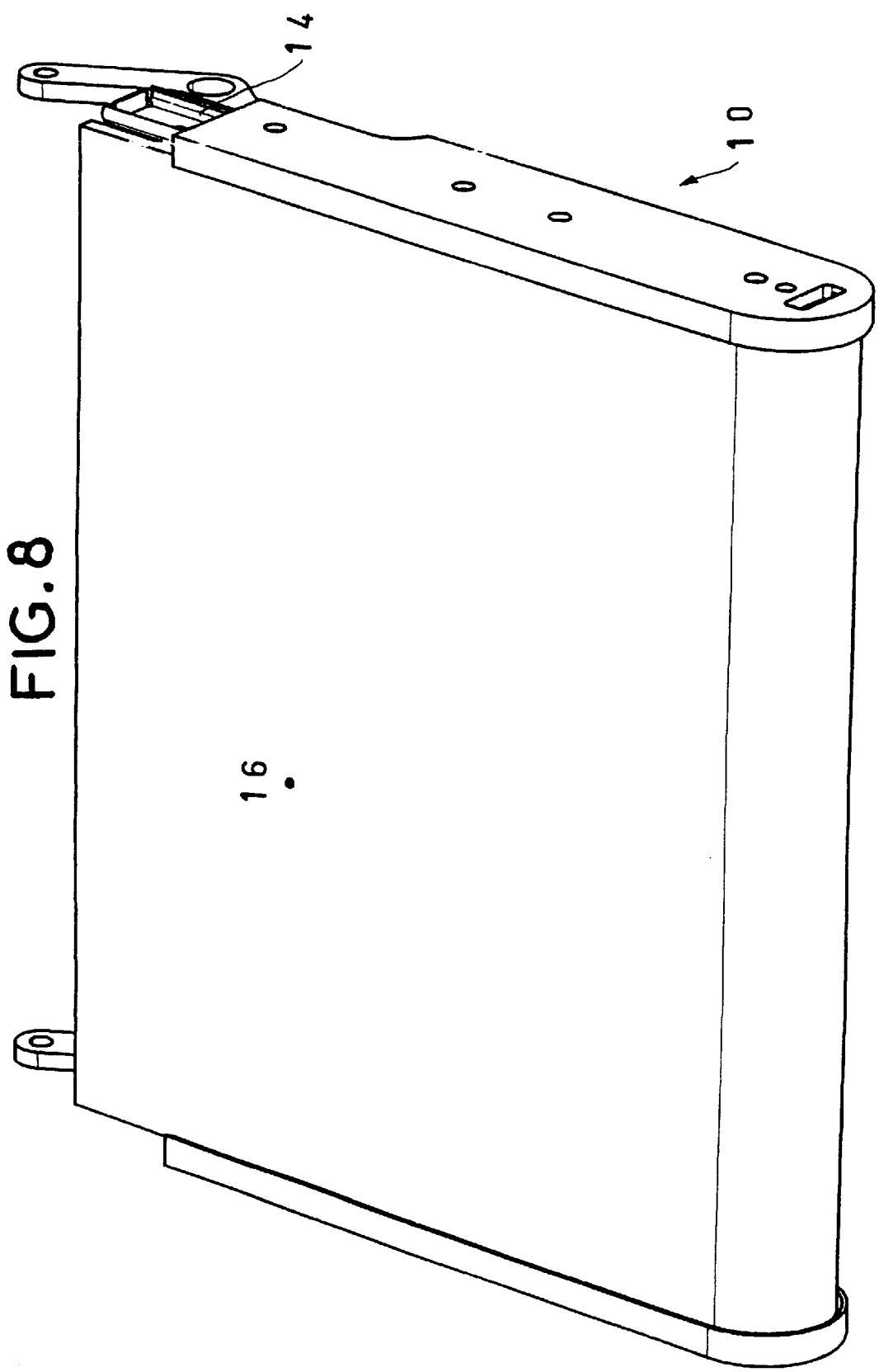
FIG. 8 is a perspective plan view corresponding to FIG. 6.
Figure 9:
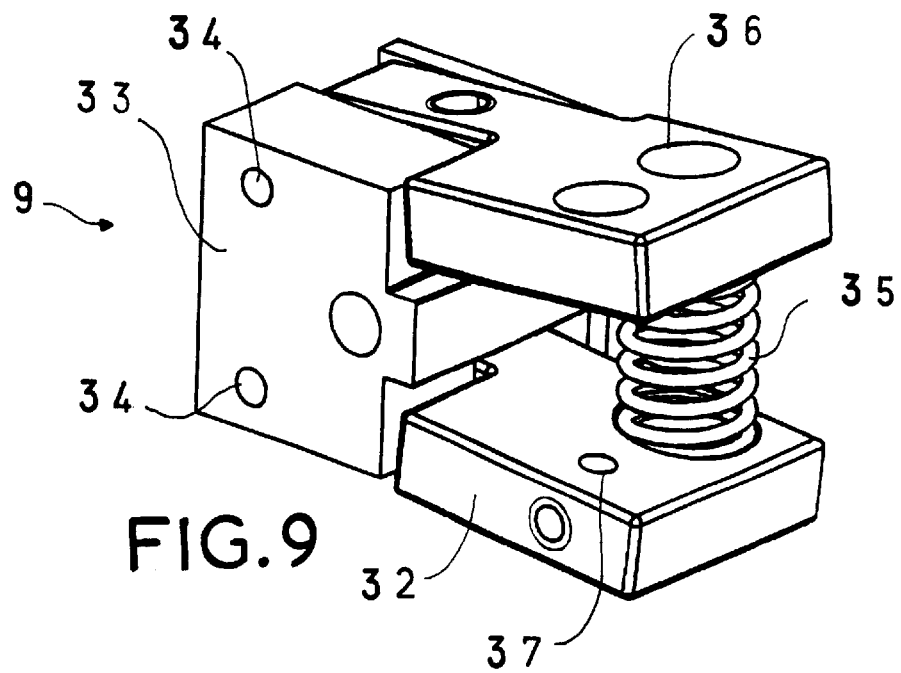
FIG. 9 is a perspective view of the locking means.
Figure 10:
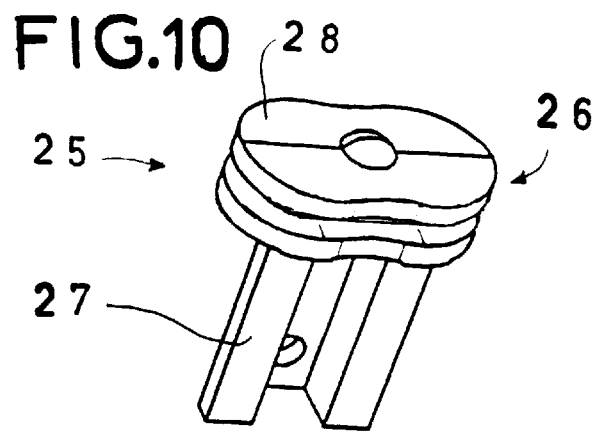
FIG. 10 is a perspective view of a guidance member of the roller shutter.
Figure 11:
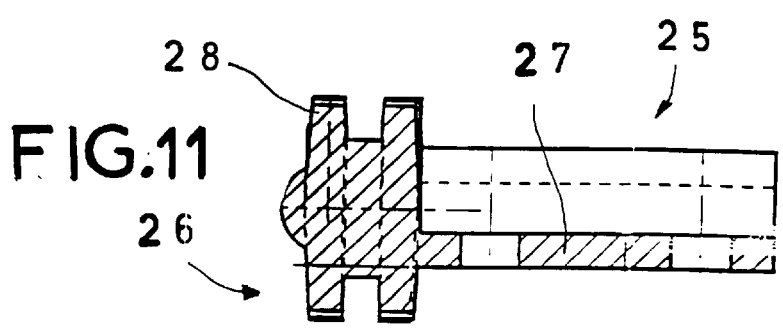
FIG. 11 is a view in section of this guidance member.

FIGS. 3a and 3b illustrate another embodiment in which guidance tracks 41, fixed with respect to the body 1 of the leg rest, are provided for storage of the unused part of the roller shutter 16. This roller shutter 16 now has an end 42 fixed with respect to the extension (not shown in these figures).

The tracks 41 are also in a U shape but inverted with respect to the tracks 12, that is to say the base of the U is now directed towards the seat squab. Tracks, not shown, fixed to the extension, are provided following the tracks 41 in order to support the deployed part of the roller shutter 16.

As a variant, the tracks 41 could be extended below the seat squab instead of folding up in a U. The possibility which the roller shutter 16 has of folding allows the variable angle between the body 1 of the leg rest and the seat squab.

Embodiments have been described above in which the extension of the leg rest and the unfolding of the roller shutter are the effect of the pressure exerted by the user on the foot rest. Naturally an electric drive or other could be provided.

In the latter case, it is possible to control the actuators for the pivoting movement of the leg rest body and the translational movement of the extension. Thus it is possible to provide an unfolding and folding logic making it possible in particular to prevent interference with the ground or a vertical wall.

What is claimed is:

1. A leg rest for an aircraft seat, said leg rest comprising:
   a body having a generally flat support surface (6);
   pivoting means (3) for mounting the body so as to pivot about the front edge of a squab of the seat, so that the surface of the seat squab and the support surface of the body form a dihedron with variable angles;
   extension means (2) movable from a retracted position to unfolded positions in order to adjustably extend the body on its side opposite to the pivoting means;
   a roller shutter (16); and
   guidance means (12, 25; 41) for deploying the roller shutter when the extension means is unfolded so that the roller shutter comes in line with the support surface of the body of the leg rest.

2. A leg rest according to claim 1, characterized in that the movable extension means form a frame substantially in a U shape, with a base (31) of the frame directed, with respect to the body of the leg rest, in a direction opposite the body of the leg rest.

3. A leg rest according to claim 1, characterised in that the roller shutter comprises a plurality of slats (17) articulated on each other.

4. A leg rest according to claim 3, characterized in that the plurality of slats are articulated on each other by means of cooperating transverse cylindrical and concentric ribs (21, 22, 24).

5. A leg rest according to claim 4, characterized in that the axes of the transverse cylindrical and concentric ribs are situated in an external support plane of the plurality of slats.

6. A leg rest according to claim 1, characterized in that the guidance means comprise guidance tracks (12; 41) arranged to cooperate with guidance members (25) disposed laterally on the roller shutter.

7. A leg rest according to claim 6, characterized in that the plurality of slats are hollow and the guidance members form end plugs for the plurality of slats.

8. A leg rest according to claim 6, characterized in that the guidance members are friction members with a longitudinal section substantially in the shape of a knucklebone.

9. A leg rest according to claim 1, characterized in that one (40) of the longitudinal ends of the roller shutter is fixed with respect to the body of the leg rest, close to the edge of the leg rest, the roller shutter being arranged so as to be deployed from this end.

10. A leg rest according to claim 9, characterized in that the roller shutter is stored underneath the body of the leg rest with each of its lateral edges engaged in a guidance track (12) substantially in a shape of a U fixed to the movable extension means, a base of the guidance track being directed, with respect to the body of the leg rest, in a direction opposite the body of the leg rest.

11. A leg rest according to claim 1, characterized in that one (42) of the longitudinal ends of the roller shutter is fixed with respect to the movable extension means, the roller shutter being arranged so as to be deployed between this end and the edge of the leg rest opposite the seat squab.

12. A leg rest according to claim 11, characterized in that the roller shutter is stored underneath the body of the leg rest with each of its lateral edges engaged in a guidance track (41) substantially in a shape of a U fixed to the body of the leg rest, a base of the guidance track being directed with respect to the body of the leg rest, towards the body of the leg rest.

13. A leg rest according to claim 11, characterized in that the roller shutter is stored partially underneath the body of the leg rest, with each of its lateral edges engaged in a guidance track fixed in part to the body of the leg rest.

14. A leg rest according to claim 1, characterized in that it comprises connection means (9, 29) for connecting the body of the leg rest and the extension means.

15. A leg rest according to claim 14, characterized in that the connection means comprise a rod (29), one end of which is fixed to the extension means, and means (9) of locking the rod fixed to the body of the leg rest.

16. A leg rest according to claim 15, characterized in that the locking means comprise two articulated locking members (32) provided with passage holes (36) for the rod, and elastic means (35) arranged to put the passage holes out of alignment.

17. A leg rest according to claim 1, characterized in that it comprises complementary runners (13, 14) fixed respectively to the movable extension means and the leg rest body for a relative movement of the leg rest body and the movable extension means.

18. A leg rest according to claim 1, characterized in that it comprises return means (38, 39) for returning the movable extension means to their retracted position.

19. A leg rest according to claim 18, characterized in that the return means comprise at least one elastic cable (38), one end of which is fixed to the body of the leg rest and the other end of which is fixed to the extension means.

20. A leg rest according to claim 19, characterized in that it has at least one pulley (39) fixed to the extension means and through which the elastic cable passes.

21. An aircraft seat characterized in that it comprises a leg rest according to claim 1.

* * * * *